(12) United States Patent
Shavitt

(10) Patent No.: US 6,246,689 B1
(45) Date of Patent: Jun. 12, 2001

(54) METHOD AND APPARATUS FOR EFFICIENT TOPOLOGY AGGREGATION FOR NETWORKS WITH HIERARCHICAL STRUCTURE

(75) Inventor: Yuval Shavitt, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/157,858

(22) Filed: Sep. 21, 1998

(51) Int. Cl.[7] .................................................... H04L 12/44
(52) U.S. Cl. ........................................... 370/406; 370/256
(58) Field of Search .................................... 370/255, 256, 370/408, 395, 400, 406; 709/242

(56) References Cited

U.S. PATENT DOCUMENTS

| 5,535,195 | 7/1996 | Lee | 370/54 |
| 6,122,283 | * 8/2000 | Lee | 370/408 |

OTHER PUBLICATIONS

B. Awerbuch et al. "Routing Through Networks with Hierarchical Topology Aggregation", *Journal of High Speed Networks*, vol. 7, No. 1, 1998.

B. Awerbuch et al. "Topology Aggregation for Directed Graphs", *Third (IEEE) Symposium on Computers and Communications*, pp. 47–52, Jun. 1998.

W. C. Lee "Topology Aggregation for Hierarchical Routing in ATM Networks", *Computer Communication Review*, vol. 25, No. 2, pp. 82–92, Apr. 1995.

* cited by examiner

*Primary Examiner*—Douglas Olms
*Assistant Examiner*—Ken Vanderpuye

(57) ABSTRACT

Efficient topology aggregation is realized by generating a full-mesh topology from an original sub-network topology, without compromising accuracy. Then, the full-mesh topology is reduced to a first spanning tree aggregation topology. Distortion in the first spanning tree aggregation topology is evaluated to determine if the resultant spanning tree aggregation topology requires further refinement in order to meet a predetermined distortion criterion. If no further refinement is required, the aggregation topology is advertised. Additionally, a network parameter, e.g., a so-called network radius is generated from the full-mesh topology. In this example, the network parameter is evaluated along with the first spanning tree aggregation topology to determine if the spanning tree aggregation topology requires further refinement. If no further refinement is required, both the aggregation topology and the network parameter are advertised.

54 Claims, 2 Drawing Sheets

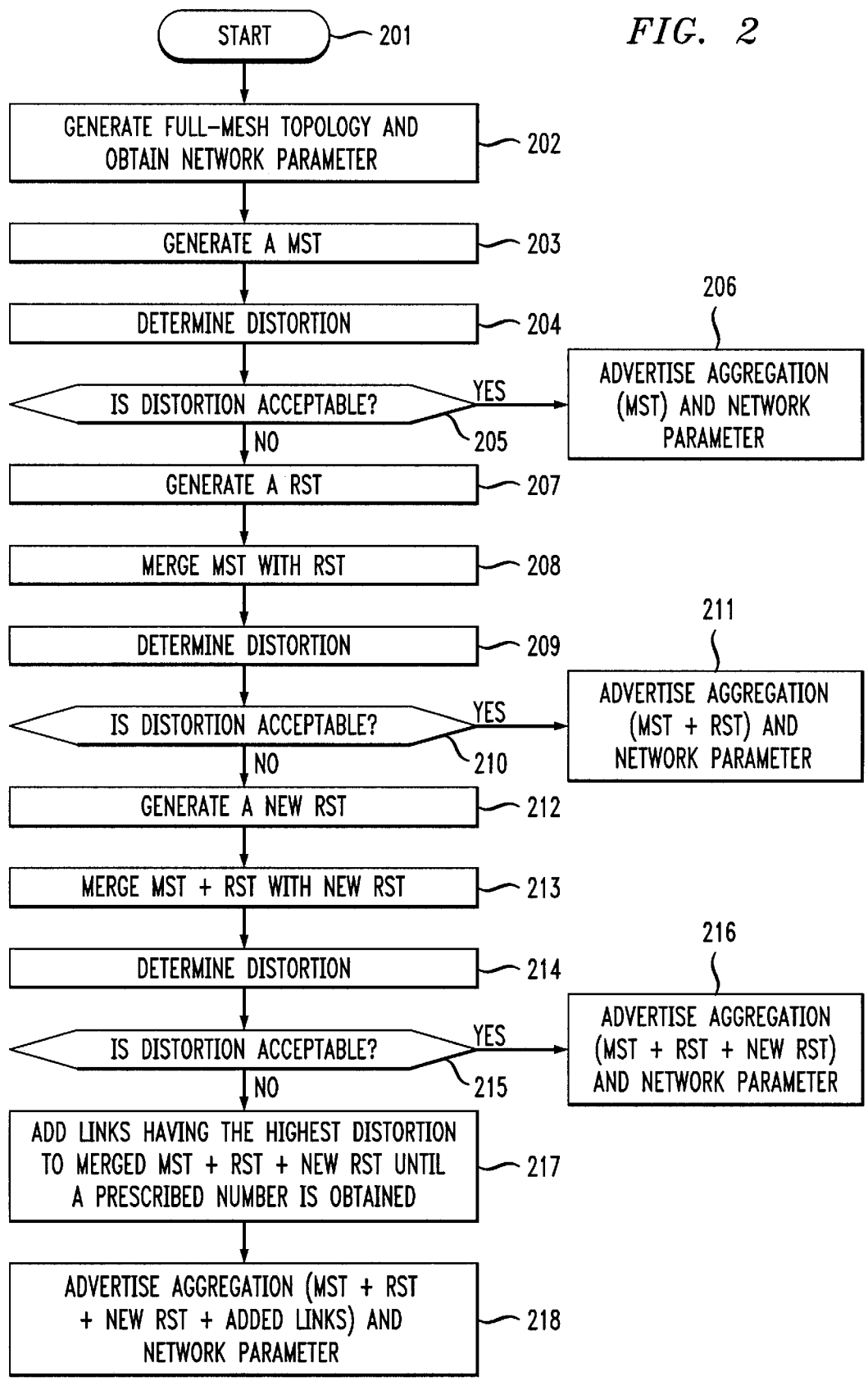

METHOD AND APPARATUS FOR EFFICIENT TOPOLOGY AGGREGATION FOR NETWORKS WITH HIERARCHICAL STRUCTURE

TECHNICAL FIELD

This invention relates to aggregating the topology of a sub-network and, more particularly, to efficient aggregation of hierarchically organized networks.

BACKGROUND OF THE INVENTION

A typical communication system is made up of nodes, including switching systems, which are interconnected by so-called links including transmission facilities. When such a communication system is arranged to include a hierarchical arrangement of subnetworks, or domains, there is a need to advertise, i.e., to distribute, the topologies of the sub-networks in a compact manner. One such communication system is the Asynchronous Transfer Mode (ATM) system. Usually, the relevant topology information to be advertised is the value of some network topology parameter, for example, delay, available bandwidth, usage cost, distance, or the like, related to traversing the network between so-called border nodes. Note that a border node is one having a link to a node outside the sub-network. For an accurate representation of the network topology parameters, the number of values that should be advertised is quadratic in the number of border nodes. If the number of values to be advertised can be reduced, there will be a corresponding reduction in the cost of storing, advertising and calculating routing based on the values. However, the compression of the number of the topology parameter values required to realize these advantages introduces errors, i.e., distortion, between the advertised and real value of the network parameter between some of the border nodes.

SUMMARY OF THE INVENTION

These and other problems and limitations of such topology aggregation techniques are addressed in apparatus and a method for efficient topology aggregation by utilizing a so-called full-mesh topology that is generated from an original sub-network topology, without compromising accuracy. Then, the full-mesh topology is reduced to a first spanning tree aggregation topology. Distortion in the first spanning tree aggregation topology is evaluated in accordance with prescribed criteria to determine if the resultant spanning tree aggregation topology requires further refinement in order to meet a predetermined distortion criterion. If no further refinement of the aggregation topology is required the aggregation topology is advertised.

Additionally, a prescribed network parameter, for example, a so-called network radius, defined as one-half the maximum distance between any two nodes in the full-mesh topology, is generated from the full-mesh topology. In this example, the network parameter is the network "radius", which is evaluated along with the first spanning tree aggregation topology to determine if the resultant spanning tree aggregation topology requires further refinement. If no further refinement is required, both the aggregation topology and the network parameter are advertised.

Specifically, the need, or not, for further refinement of the first spanning tree aggregation topology, i.e., topology to be advertised, is based on a distortion measure. Distortion is defined as the ratio of the value of the network topology parameter as determined from the aggregation topology to be advertised and the network parameter, e.g., network, radius, and the value of the network topology parameter in the full-mesh topology.

In one embodiment of the invention, the firs spanning tree is a minimum spanning tree (MST) and the cost of the network topology parameter is the cost of the shortest path between a pair of border nodes.

If the resultant first spanning tree aggregation topology requires further refinement to reduce the distortion, a second spanning tree aggregation topology, different from the first, is generated and merged with the first spanning tree aggregation topology to yield a first merged aggregation topology. The first merged aggregation topology is evaluated for distortion, along with the network parameter, and if it is satisfactory no further refinement is required. However, if further refinement is needed to reduce distortion, another second spanning tree aggregation topology is generated and merged with the first merged aggregation topology to yield a second merged aggregation topology. Then, the second merged aggregation topology is evaluated for distortion, along with the network parameter, and if it is satisfactory no further refinement is required. If still more refinement is required to reduce the distortion, links between nodes having the highest level of distortion are added to the second merged aggregation topology until a prescribed number of links is reached. The prescribed number of links is related to the number of border nodes in the aggregated, i.e., original or full-mesh, topology.

In another embodiment of the invention, the first spanning tree is a minimum spanning tree (MST) and the second spanning tree is a random spanning tree (RST), while the cost of the network topology parameter is still the cost of the shortest path between a pair of border nodes.

In still another embodiment of the invention, the first spanning tree is a minimum spanning tree (MST) and the second spanning tree is a first random spanning tree (RST), which are merged with another second spanning tree that is a second random spanning tree (new RST), to yield the second merged aggregation topology, i.e., MTS+RTS+new RTS.

In yet another embodiment of the invention, links between nodes having the highest distortion are added to the second merged aggregation topology, i.e., MST+RST+new RST, until the prescribed number of links is reached.

BRIEF DESCRIPTION OF THE DRAWING

FIG. 2 is a flow chart illustrating the steps used in the embodiment of the invention employed in the apparatus of FIG. 1.

DETAILED DESCRIPTION

Figure 1:
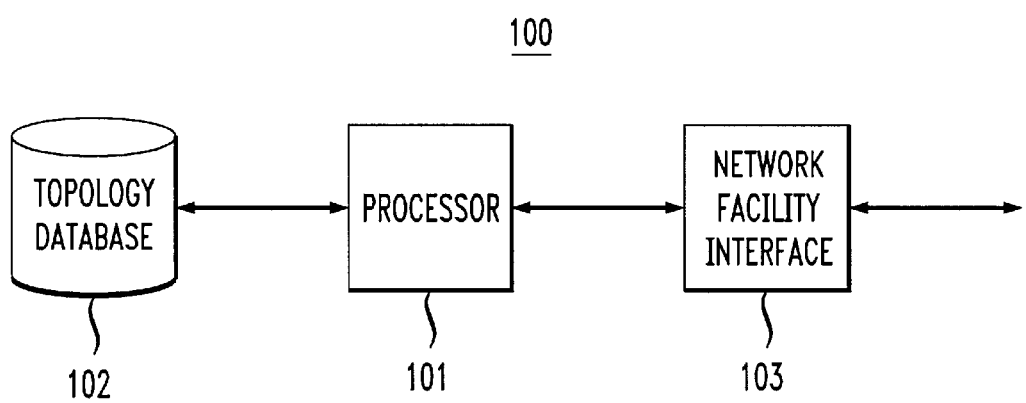
FIG. 1 shows, in simplified block diagram form, details of apparatus including an embodiment of the invention for use in a communication system node.

FIG. 1. shows, in simplified block diagram form, details of apparatus including an embodiment of the invention for use in a communication system node 100. Specifically, the apparatus is intended for use in a communication system node that maintains a network topology data base. One such communication system is the Asynchronous Transfer Mode (ATM) system. Thus, shown are processor 101, topology data base 102 and network facility interface 103. Network facility interface 103 is employed to couple node 100 via one or more transmission facility to one or more nodes in the communication system and to receive network topology updates. The topology updates are stored under control of processor 101 in topology data base 102. Additionally, interface 103 is employed under control of processor 101 to couple topology information to be advertised, i.e., distributed, along with a prescribed network parameter. In this example, so-called aggregation topology information is to be advertised in a manner known in the art. The manner in which aggregation topology information and the network parameter are generated is discussed below in relationship to the process steps shown in the flow chart of FIG. 2. The aggregation topology and network parameter information to be advertised is controllably inserted into the communication system transmission format, for example, into cells of the ATM transmission format. More specifically, one such communication system is the ATM system and, in particular, the hierarchical PNNI (Private Network-to-Network Interface) used for routing in the ATM system. The information to be advertised includes, for example, a list of border nodes in the network, the value of the network parameter, i.e., radius, and an aggregation topology (i.e., a collection of so-called exceptions in PNNI).

FIG. 2 is a flow chart illustrating the steps used in a process employed in processor 101 of FIG. 1. Note that for brevity and clarity of exposition it is assumed that the generation of the fall-mesh topology of the network is known and, additionally, that the generation of spanning tree topologies including a minimum spanning tree and a random spanning tree are well known in the art.

Specifically, the method on the invention is started in step 201. Thereafter, step 202 generates the full-mesh topology from the aggregated topology in well known fashion and obtains the network parameter. Note that the aggregated topology has a plurality of nodes and links coupling node pairs, and includes "b" border nodes and "b(b−1)/2" possible links coupling the border nodes. Also, the full-mesh topology is comprised of a plurality of nodes and virtual links coupling node pairs, and includes the border nodes of the aggregated topology. As indicated above, in this example, the network parameter is representative of the network radius of the aggregated, i.e., original or full-mesh, topology. Specifically, the network radius is one half the network diameter, which is defined as the distance between any two nodes in the aggregated topology. Then, in step 203 a first spanning tree aggregation topology of the full-mesh network is generated, for example, a minimum spanning tree (MST) aggregation topology, which is a compression of the known network full-mesh topology. The first spanning tree aggregation topology also is comprises of a plurality of nodes including the border nodes of the full-mesh topology and has a prescribed number of virtual links coupling the nodes. Then, in step 204 the distortion of the resultant minimum spanning tree aggregation topology is determined.

Briefly, distortion of the resultant aggregation topology is evaluated to determine if the quality of aggregation of the sub-network topology is acceptable. To this end, for this example, the following terms are defined: A distance matrix is a matrix of size b×b, where "b" is the number of nodes in the topology and an element (i, j) represents the distance between node "i" and node "j". The distance is the cost of the shortest path between node "i" and node "j". Distortion for nodes "i" and "j" is defined as the ratio between the distance between nodes "i" and "j" in the resultant topology, either the first spanning tree aggregation topology or the merged aggregation topologies (discussed below), and the distance between nodes "i" and "j" in the full-mesh topology (this value is always greater than one (1)). It is noted that not only worst case distortion is evaluated but also the average and variance. This is because, it has been shown that a worst case distortion analysis alone cannot predict the efficiency of aggregation for routing in hierarchically organized networks.

In step 205 the distortion is evaluated to determine if the aggregation resulted in a desired quality of aggregation. Whether the distortion of the aggregation is acceptable is evaluated in accordance with prescribed criteria. Examples of such prescribed criteria are as follows:

1. If the worst case distortion is smaller than some constant "x", or smaller than some function of the resultant aggregation topology size such as log (b), log(log(b)), $\sqrt[3]{\sqrt{b}}$, or the like, the distortion is acceptable for a desired quality of aggregation, where "b" is the number of border nodes in the aggregated topology.

2. If the number of node pairs distorted by more than a predetermined constant or a function of the aggregation topology size is smaller than a constant or a function of the aggregation topology size, the distortion is acceptable for the desired quality of aggregation. Stated another way, if the distortion distribution tail is "tin" enough, the distortion is acceptable for the desired quality of aggregation.

If the distortion is acceptable, i.e., a YES result, as determined in step 205, the aggregation topology, i.e., MST, is advertised, along with the network parameter, i.e., network radius, in step 206, and the process is ended.

If the distortion is not acceptable, i.e., a NO result, as determined in step 205, control is transferred to step 207 and a second spanning tree, e.g., a random spanning tree (RST), topology is generated. Then, the generated RST is merged with the MST in step 208 to yield a first merged aggregation topology. Note that the merging of two topologies, in this example spanning trees, is the collection of all the nodes and links of the two topologies. Thereafter, the distortion of the first merged aggregation topology, i.e., MST+RST, is determined in step 209. The distortion is determined as in step 204 above. The resultant distortion determined in step 209 is evaluated in step 210, in the same manner as in step 205 above. If the distortion is acceptable, i.e., a YES result, as determined in step 210, the first merged aggregation topology, i.e., MST+RST, is advertised, along with the network parameter in step 211, and the process is ended.

If the distortion is not acceptable, i.e., a NO result, as determined in step 210, control is transferred to step 212 and a third spanning tree, e.g., a new random spanning tree (new RST), is generated. Then, the generated new RST is merged with the previously generated MST and previously generated RTS aggregation topologies in step 213 to form a second merged aggregation topology. Again, note that the merging of three topologies, in this example spanning trees, is the collection of all the nodes and links of the three topologies. Thereafter, the distortion of the second merged aggregation topology, i.e., MST+RST+new RST, is determined in step 214 in the same manner as in step 204 above. The resultant distortion determined in step 214 is evaluated in step 215, in the same manner as in step 205 above. If the distortion is acceptable, i.e., a YES result, as determined in step 215, the second merged aggregation topology, i.e., MST+RST+new RST, is advertised, along with the network parameter, in step 216, and the process is ended.

If the distortion is not acceptable, i.e., a NO result, as determined in step 215, control is transferred to step 217 and links having the highest distortion are added to the second merged aggregation topology, i.e., MTS+RST+new RST, until a prescribed number of links is obtained to yield a third merged aggregation topology. In this example, the prescribed number of links is "3b", where "b" is the number of border nodes in the aggregated topology. Once the prescribed number of links has been reached, control is transferred to step 218 which causes the third merged aggregation topology, i.e., MST+RST+new RST+added links, to be advertised along with the network parameter, and the process is ended.

It is noted that the merged aggregation topologies all have a plurality of nodes including the border nodes and have links coupling the nodes.

What is claimed is:

1. A method for use in a communication system to obtain efficient sub-network topology aggregation of an aggregated sub-network topology, the aggregated topology including nodes and transmission links coupling the nodes and wherein nodes having links coupling nodes outside the sub-network are defined as border nodes, comprising the steps of:

generating a full-mesh topology from the aggregated topology having a plurality of nodes including border nodes of the aggregated topology and virtual links coupling all node pairs;

generating a first spanning tree aggregation topology having a plurality of nodes including border nodes of the full-mesh topology and a prescribed number of virtual links coupling the nodes;

determining distortion between all pairs of border nodes in said first spanning tree aggregation topology;

evaluating said distortion to determine whether or not a predetermined quality of aggregation has been attained of said first spanning tree aggregation topology; and if the predetermined quality of aggregation of said first spanning tree aggregation topology has been achieved, advertising the first spanning tree aggregation topology.

2. The method as defined in claim 1 wherein said first spanning tree is a minimum spanning tree (MTS).

3. The method as defined in claim 1 further including a step of generating a network parameter of said aggregated topology and said step of advertising includes advertising said network parameter along with said first spanning tree aggregation topology.

4. The method as defined in claim 3 wherein said network parameter is one-half the diameter of said aggregated topology, said diameter being the maximum distance between any two nodes in the aggregated topology.

5. The method as defined in claim 1, if the predetermined quality of aggregation has not been achieved of the first spanning tree aggregation topology, further including a step of further refining the first spanning tree aggregation topology including the steps of generating a second spanning tree aggregation topology having nodes and transmission links coupling the nodes, merging said second spanning tree aggregation topology with said first spanning tree aggregation topology to obtain a first merged aggregation topology, said first merged aggregation topology having a plurality of nodes including border nodes of the full-mesh topology and a prescribed number of virtual links coupling the nodes, determining distortion between all pairs of border nodes in said first merged aggregation topology, evaluating said distortion to determine whether or not a predetermined quality of aggregation has been attained, and if the predetermined quality of aggregation has been achieved, advertising the first merged aggregation topology.

6. The method as defined in claim 5 wherein said first spanning tree is a minimum spanning tree (MST) and said second spanning tree is a random spanning tree (RST), and said first merged aggregation topology is MST+RST.

7. The method as defined in claim 5 further including a step of generating a network parameter of said aggregated topology and said step of advertising includes advertising said network parameter along with said first merged aggregation topology.

8. The method as defined in claim 7 wherein said network parameter is one-half the diameter of said aggregated topology, said diameter being the maximum distance between any two nodes in the aggregated topology.

9. The method as defined in claim 5, if the predetermined quality of aggregation of said first merged aggregation topology has not been achieved, further including a step of further-refining the first merged aggregation topology including the steps of generating a third spanning tree aggregation topology having nodes and transmission links coupling the nodes, merging said third spanning tree aggregation topology with said first spanning tree aggregation topology and said second spanning tree aggregation topology to obtain a second merged aggregation topology, said first merged aggregation topology having a plurality of nodes including border nodes of the full-mesh topology and a prescribed number of virtual links coupling the nodes, determining distortion between all pairs of border nodes in said second merged aggregation topology, evaluating said distortion to determine whether or not a predetermined quality of aggregation has been attained of said first merged aggregation topology, and if the predetermined quality of aggregation has been achieved, advertising said second merged aggregation topology.

10. The method as defined in claim 9 wherein said first spanning tree is a minimum spanning tree (MST), said second spanning tree is a random spanning tree (RST), said third spanning tree is a new random spanning tree (new RST), and said second merged aggregation topology is MST+RST+new RST.

11. The method as defined in claim 9 further including a step of generating a network parameter of said aggregated topology and said step of advertising includes advertising network parameter along with said second merged aggregation topology.

12. The method as defined in claim 11 wherein said network parameter is one half the diameter of said aggregated topology, said diameter being the maximum distance between any two nodes in the aggregated topology.

13. The method as defined in claim 9, if the predetermined quality of aggregation of said second merged aggregation topology has not been achieved, further including a step of further refining the second merged aggregation topology including the steps of adding links from said aggregated topology having the highest distortion to said second merged aggregation topology until a prescribed number of links has been reached to generate a third merged aggregation topology, and advertising said third merged aggregation topology.

14. The method as defined in claim 13 wherein said first spanning tree is a minimum spanning tree (MST), said second spanning tree is a random spanning tree (RST), said third spanning tree is a new random spanning tree (new RST), and said third merged aggregation topology is MST+RST+new RST+added links.

15. The method as defined in claim 13 wherein said prescribed number of links is related to the number of border nodes in said aggregated topology.

16. The method as defined in claim 15 wherein said prescribed number of links is 3b, where b is the number of border nodes in said aggregated topology.

17. The method as defined in claim 13 further including a step of generating a network parameter of said aggregated topology and said step of advertising includes advertising said network parameter along with said third merged aggregation topology.

18. The method as defined in claim 17 wherein said network parameter is one-half the diameter of said aggregated topology, said diameter being the maximum distance between any two nodes in the aggregated topology.

19. Apparatus for use in a communication system node to obtain efficient sub-network topology aggregation of an aggregated sub-network topology, the aggregated topology including nodes and transmission links coupling the nodes and wherein nodes having links coupling nodes outside the sub-network are defined as border nodes, the apparatus comprising:

means for generating a full-mesh topology from the aggregated topology having a plurality of nodes including border nodes of the aggregated topology and virtual links coupling all node pairs;

means for generating a first spanning tree aggregation topology having a plurality of nodes including border nodes of the full-mesh topology and a prescribed number of virtual links coupling the nodes;

means for determining distortion between all pairs of border nodes in said first spanning tree aggregation topology;

means for evaluating said distortion to determine whether or not a predetermined quality of aggregation of said first spanning tree aggregation topology has been attained; and means, responsive to an indication that the prescribed quality of aggregation has been achieved, for advertising the first spanning tree aggregation topology.

20. The invention as defined in claim 19 wherein said first spanning tree is a minimum spanning tree (MTS).

21. The invention as defined in claim 19 further including a means for generating a network parameter of said aggregated topology and said step of advertising includes advertising said network parameter along with said first spanning tree aggregation topology.

22. The invention as defined in claim 21 wherein said network parameter is one-half the diameter of said aggregated topology, said diameter being the maximum distance between any two nodes in the aggregated topology.

23. The invention as defined in claim 19 further including means, responsive to an indication that said prescribed quality of aggregation has not been achieved of the first spanning tree aggregation topology, for further refining the aggregation topology including means for generating a second spanning tree aggregation topology having nodes and transmission links coupling the nodes, means for merging said second spanning tree aggregation topology with said first spanning tree aggregation topology to obtain a first merged aggregation topology, said first merged aggregation topology having a plurality of nodes including border nodes of the full-mesh topology and a prescribed number of virtual links coupling the nodes, means for determining distortion between all pairs of border nodes in said first merged aggregation topology, means for evaluating said distortion to determine whether or not said prescribed quality of aggregation has been attained, and means responsive to an indication that said prescribed quality of aggregation has been achieved, for advertising the first merged aggregation topology.

24. The invention as defined in claim 23 wherein said first spanning tree is a minimum spanning tree (MST) and said second spanning tree is a random spanning tree (RST), and said first merged aggregation topology is MST+RST.

25. The invention as defined in claim 23 further means for generating a network parameter of said aggregated topology and said means for advertising said first merged aggregation includes advertising said network parameter along with said first merged aggregation topology.

26. The invention as defined in claim 25 wherein said network parameter is one-half the diameter of said aggregated topology, said diameter being the maximum distance between any two nodes in the aggregated topology.

27. The invention as defined in claim 23, further including means, responsive to an indication that said prescribed quality of aggregation of said first merged aggregation topology has not been achieved, for further refining the first merged aggregation topology including means for generating a third spanning tree aggregation topology having nodes and transmission links coupling the nodes, means for merging said third spanning tree aggregation topology with said first spanning tree aggregation topology and said second spanning tree aggregation topology to obtain a second merged aggregation topology, said first merged aggregation topology having a plurality of nodes including border nodes of the full-mesh topology and a prescribed number of virtual links coupling the nodes, means for determining distortion between all pairs of border nodes in said second merged aggregation topology, means for evaluating said distortion to determine whether or not a prescribed quality of aggregation has been attained of said second merged aggregation topology, and means, responsive to an indication that said prescribed quality of aggregation of said second merged aggregation topology has been achieved, for advertising said second merged aggregation topology.

28. The invention as defined in claim 27 wherein said first spanning tree is a minimum spanning tree (MST), said second spanning tree is a random spanning tree (RST), said third spanning tree is a new random spanning tree (new RST), and said second merged aggregation topology is MST+RST+new RST.

29. The invention as defined in claim 27 further including means for generating a network parameter of said aggregated topology and said means for advertising said second merged aggregation topology includes means for advertising said network parameter along with said second merged aggregation topology.

30. The invention as defined in claim 29 wherein said network parameter is one half the diameter of said aggregated topology, said diameter being the maximum distance between any two nodes in the aggregated topology.

31. The invention as defined in claim 27 further including means, responsive to an indication that said prescribed quality of aggregation of said second merged aggregation topology has not been achieved, for further refining the second merged aggregation topology including means for adding links from said aggregated topology having the highest distortion to said second merged aggregation topology until a prescribed number of links has been reached to generate a third merged aggregation topology, and means for advertising said third merged aggregation topology.

32. The invention as defined in claim 31 wherein said first spanning tree is a minimum spanning tree (MST), said second spanning tree is a random spanning tree (RST), said third spanning tree is a new random spanning tree (new RST), and said third merged aggregation topology is MST+RST+new RST+added links.

33. The invention as defined in claim 31 wherein said prescribed number of links is related to the number of border nodes in said aggregated topology.

34. The invention as defined in claim 33 wherein said prescribed number of links is 3b, where b is the number of border nodes in said aggregated topology.

35. The invention as defined in claim 31 further including means for generating a network parameter of said aggregated topology and said mans for advertising said third merged aggregation topology includes means for advertising said network parameter along with said third merged aggregation topology.

36. The invention as defined in claim 35 wherein said network parameter is one-half the diameter of said aggregated topology, said diameter being the maximum distance between any two nodes in the aggregated topology.

37. Apparatus for use in a communication system node to obtain efficient sub-network topology aggregation of an aggregated sub-network topology, the aggregated topology including nodes and transmission links coupling the nodes and wherein nodes having links coupling nodes outside the sub-network are defined as border nodes, the apparatus comprising:

a full-mesh topology generator for generating a full-mesh topology from the aggregated topology having a plurality of nodes including border nodes of the aggregated topology and virtual links coupling all node pairs;

a first aggregation topology generator for generating a first spanning tree aggregation topology having a plurality of nodes including border nodes of the full-mesh topology and a prescribed number of virtual links coupling the nodes;

a first distortion detector for determining distortion between all pairs of border nodes in said first spanning tree aggregation topology;

a first evaluator for evaluating said distortion to determine whether or not a prescribed quality of aggregation of said first spanning tree aggregation topology has been attained; and a first advertiser, responsive to an indication that said prescribed quality of aggregation has been achieved, for advertising the first spanning tree aggregation topology.

38. The apparatus as defined in claim 37 wherein said first spanning tree is a minimum spanning tree (MST).

39. The apparatus as defined in claim 37 further including a parameter generator for generating a network parameter of said aggregated topology and said first advertiser advertises said network parameter along with said first spanning tree aggregation topology.

40. The apparatus as defined in claim 39 wherein said network parameter is one-half the diameter of said aggregated topology, said diameter being the maximum distance between any two nodes in the aggregated topology.

41. The apparatus as defined in claim 37 further including a first refiner, responsive to an indication that the prescribed quality of aggregation has not been achieved of the first spanning tree aggregation topology, for further refining the first spanning tree aggregation topology including a second aggregation topology generator for generating a second spanning tree aggregation topology having nodes and transmission links coupling the nodes, a first merger for merging said second spanning tree aggregation topology with said first spanning tree aggregation topology to obtain a first merged aggregation topology, said first merged aggregation topology having a plurality of nodes including border nodes of the full-mesh topology and a prescribed number of virtual links coupling the nodes, a second distortion detector for determining distortion between all pairs of border nodes in said first merged aggregation topology, a second evaluator for evaluating said distortion of said first merged aggregation topology to determine whether or not a predetermined quality of aggregation has been attained of said second merged aggregation topology, and a second advertiser, responsive to an indication that said prescribed quality of aggregation of said first merged aggregation topology has been achieved, for advertising the first merged aggregation topology.

42. The apparatus as defined in claim 41 wherein said first spanning tree is a minimum spanning tree (MST) and said second spanning tree is a random spanning tree (RST), and said first merged aggregation topology is MST+RST.

43. The apparatus as defined in claim 41 further including a parameter generator for generating a network parameter of said aggregated topology and said second advertiser advertises said network parameter along with said first merged aggregation topology.

44. The apparatus as defined in claim 43 wherein said network parameter is one-half the diameter of said aggregated topology, said diameter being the maximum distance between any two nodes in the aggregated topology.

45. The apparatus as defined in claim 41 further including a second refiner, responsive to an indication that said prescribed quality of aggregation of said first merged aggregation topology has not been achieved, for further refining the second merged aggregation topology including a third aggregation topology generator for generating a third spanning tree aggregation topology having nodes and transmission links coupling the nodes, a second merger for merging said third spanning tree aggregation topology with said first spanning tree aggregation topology and said second spanning tree aggregation topology to obtain a second merged aggregation topology, said first merged aggregation topology having a plurality of nodes including border nodes of the full-mesh topology and a prescribed number of virtual links coupling the nodes, a third distortion detector for determining distortion between all pairs of border nodes in said second merged aggregation topology, a third evaluator for evaluating said distortion of said second merged aggregation topology to determine whether or not a prescribed quality of aggregation has been attained, and a third advertiser, responsive to an indication that said prescribed quality of aggregation of said second merged aggregation topology has been achieved, for advertising said second merged aggregation topology.

46. The apparatus as defined in claim 45 wherein said first spanning tree is a minimum spanning tree (MST), said second spanning tree is a random spanning tree (RST), said third spanning tree is a new random spanning tree (new RST), and said second merged aggregation topology is MST+RST+new RST.

47. The apparatus as defined in claim 45 further including a parameter generator for generating a network parameter of said aggregated topology and said step of advertising includes advertising said network parameter along with said second merged aggregation topology.

48. The apparatus as defined in claim 47 wherein said network parameter is one half the diameter of said aggregated topology, said diameter being the maximum distance between any two nodes in the aggregated topology.

49. The apparatus as defined in claim 45 further including a third refiner, responsive to an indication that said prescribed quality of aggregation of said second merged aggregation topology has not been achieved, for further refining the second merged aggregation topology including an adder for adding links from said aggregated topology having the highest distortion to said second merged aggregation topology until a prescribed number of links has been reached to generate a third merged aggregation topology, and a fourth advertiser for advertising said third merged aggregation topology.

50. The apparatus as defined in claim 49 wherein said first spanning tree is a minimum spanning tree (MST), said second spanning tree is a random spanning tree (RST), said third spanning tree is a new random spanning tree (new RST), and said third merged aggregation topology is MST+RST+new RST+added links.

51. The apparatus as defined in claim 49 wherein said prescribed number of links is related to the number of border nodes in said aggregated topology.

52. The apparatus as defined in claim 51 wherein said prescribed number of links is 3b, where b is the number of border nodes in said aggregated topology.

53. The apparatus as defined in claim 49 further including a parameter generator for generating a network parameter of said aggregated topology and said step of advertising includes advertising said network parameter along with said third merged aggregation topology.

54. The apparatus as defined in claim 53 wherein said network parameter is one-half the diameter of said aggregated topology, said diameter being the maximum distance between any two nodes in the aggregated topology.

* * * * *